April 21, 1970 H. PUTTERMAN 3,508,224

SOLID-STATE SELECTION MATRIX FOR COMPUTER MEMORY APPLICATIONS

Filed Oct. 25, 1967 2 Sheets-Sheet 1

INVENTOR.
HARRY PUTTERMAN
BY Karl A. Ohralik
ATTORNEY

SOLID-STATE SELECTION MATRIX FOR COMPUTER MEMORY APPLICATIONS

Filed Oct. 25, 1967 2 Sheets-Sheet 2

*INVENTOR.*
HARRY PUTTERMAN
*BY* Karl A. Ohralik
ATTORNEY

United States Patent Office 3,508,224

Patented Apr. 21, 1970

3,508,224

SOLID-STATE SELECTION MATRIX FOR COMPUTER MEMORY APPLICATIONS

Harry Putterman, Elizabeth, N.J., assignor to Singer-General Precision, Inc., Little Falls, N.J., a corporation of Delaware Filed Oct. 25, 1967, Ser. No. 678,093
Int. Cl. H03k 3/26; G11c 7/00
U.S. Cl. 340—174 7 Claims

ABSTRACT OF THE DISCLOSURE

A memory apparatus such as a linear organized memory of the type having an array of binary magnetizable elements, each coupled to a conductive line, employs switching apparatus at each end of each line to facilitate proper, timed electrical excitation of the line. The lines are arranged in a set and another set of sensing lines are perpendicular to the lines of the one set with the memory elements located at the respective intersections of lines.

Energization of each of the one set of lines by write current in one direction and read current in the other direction is controlled by switching circuits at respective ends thereof. The switches of each circuit comprise a pair of transistors of opposite types interconnected to each other and to the lines so that in response to a single pulse applied to one of the switches, either Write Enable to one or Read Enable to the other, a low resistance current path is established between a potential source, the switch at one end of the line, the line itself, the switch at the other end of the line and a current regulator for controlling the current intensity in the line. In each instance one transistor of each switch is conductive and the other is nonconductive and in each case, the enabling pulse reverses the conductive states of the transistors of the switch to which the pulse is applied to complete a current path.

BACKGROUND OF THE INVENTION

This invention relates to electronic switch control and more particularly to the selective energization of one of a plurality of lines as in a magnetic storage or memory apparatus.

In certain types of memory apparatus, magnetizable elements such as magnetizable cores, capable of assuming either one of two states of equilibrium and being changeable from either state to the other by a magnetic field, are utilized. The magnetic field for producing such switching from one state to the other is produced by the energization of electrically conductive lines coupling the elements. For writing information into the magnetizable element, such lines require excitation by currents flowing in respective first directions therein and for reading the information from the elements, the lines require excitation by currents flowing in directions opposite to the first directions. Because of the very brief intervals of excitation time involved, of the accurate control thereof and of current magnitudes, accurate switching at respective ends of the lines is necessary. In addition, in certain environments the size, weight, power requirements and reliability are important factors as well and ideally, the switching circuit is as small and light as possible while still maintaining adequately the other desirable features thereof.

Systems for the selective energization of lines such as core lines in a core array memory include the provision of a switch at end of the line, each switch being effective in response to an electrical pulse to interconnect a potential source to the line and effective in the absence of a pulse to interconnect the line with a current regulator, are known. In such circuits, conventionally, the coupling between the gates and the high current driver transistors is accomplished with pulse transformers. Two current regulators are required, one for write currents and one for read currents.

In accordance with the present invention, line selection is achieved with circuitry devoid of transformers, employing only a single current regulator and utilizing considerably fewer circuit components such as diodes and resistors. The switching circuitry of this invention comprises a switch with a pair of transistors coupled to one end of a line and being alternatively rendered conductive to connect this end with either a potential source or a sink and another switch with pairs of transistors coupled to the other end of the line and being alternatively rendered conductive to connect the other end to either the source or the sink. The switches are effective in a quiescent state to connect the associated end of the line with the sink and are responsive to potential pulses to alter the conductive states of the transistors to disconnect the line from the sink and to connect the associated line to the potential source. In accordance with a feature of the invention, the change in conductive states of the transistors is facilitated by a simplified solid-state gate circuit responsive to the logic selection pulses as well as enabling pulses. The output of a NAND gate which receives the selection logic pulses is resistively coupled to the base of one transistor and another gate having first and second inputs connected, respectively, to the output of the NAND gate and to the enabling line, provides an output in response to the concurrence of a logical ZERO at the first input and a logical ONE at the second input.

Other objects and many additional advantages will be more readily understood by those skilled in the art after a detailed consideration of the following specification taken with the acompanying drawings.

DESCRIPTION OF THE PREFERRED EMBODIMENTS

Figure 1:
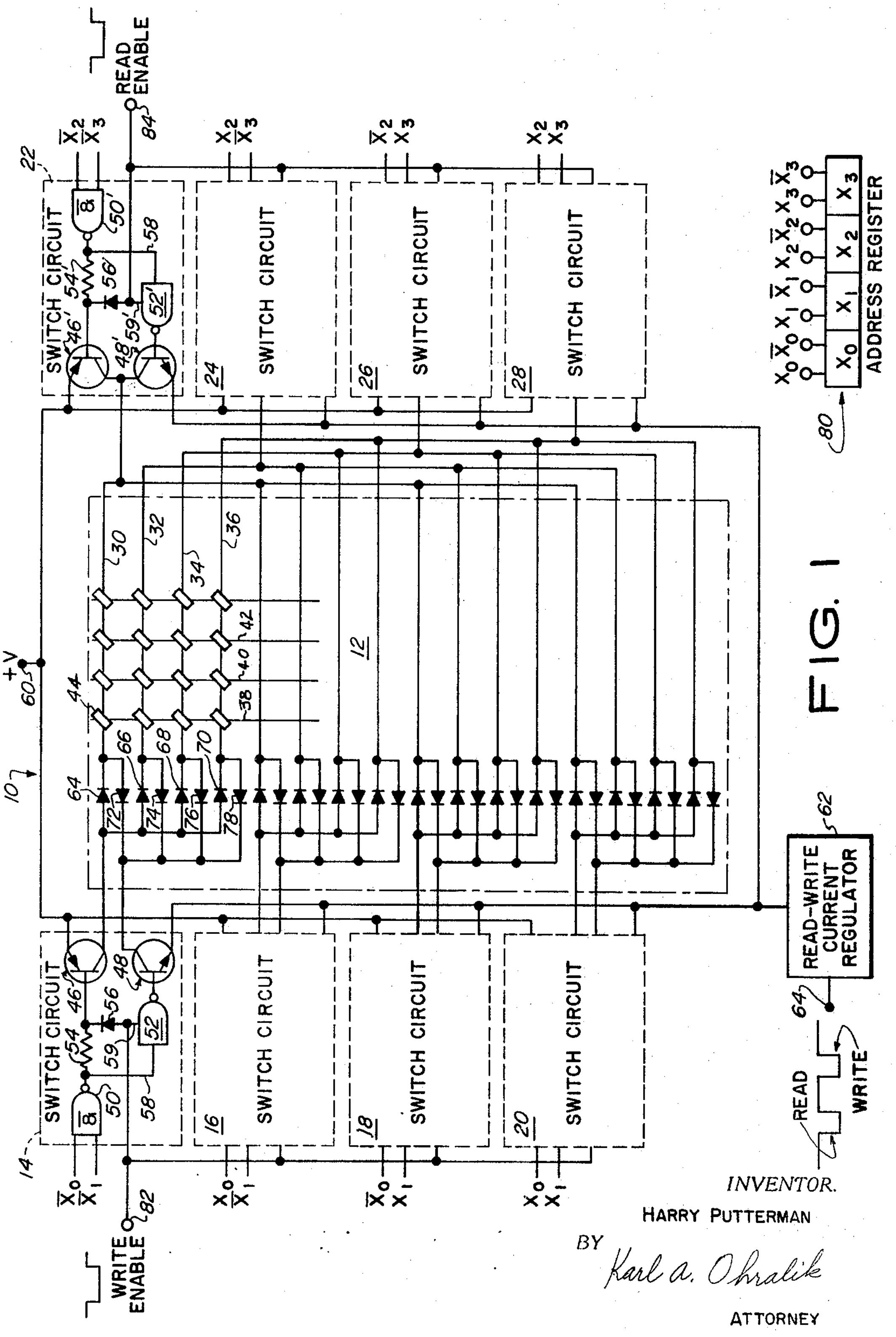
FIGURE 1 is a schematic diagram of a core array memory and switching circuit according to this invention.

Referring to FIGURE 1, 10 represents generally a memory apparatus including a core array 12 and switching circuits 14, 16, 18, and 20 responsive to Write Enable pulses and switching circuits 22, 24, 26, and 28 responsive to Read Enable pulses. These switches are of identical construction and thus, for simplicity and brevity, only switches 14 and 22 and their cooperation are shown and described in detail.

In conventional manner, the core array comprises a set of conductive horizontal lines such as shown at 30, 32, 34 and 36 and a set of conductive vertical lines such as shown at 38, 40, and 42. At the intersections of the lines are magnetizable cores such as shown at 44 and which are magnetically coupled to each of the lines. It is to be noted that the magnetizable cores are but one form of storage medium in a system in which this invention is operable and that other storage elements responsive to bipolar currents may be utilized as well.

Figure 2:
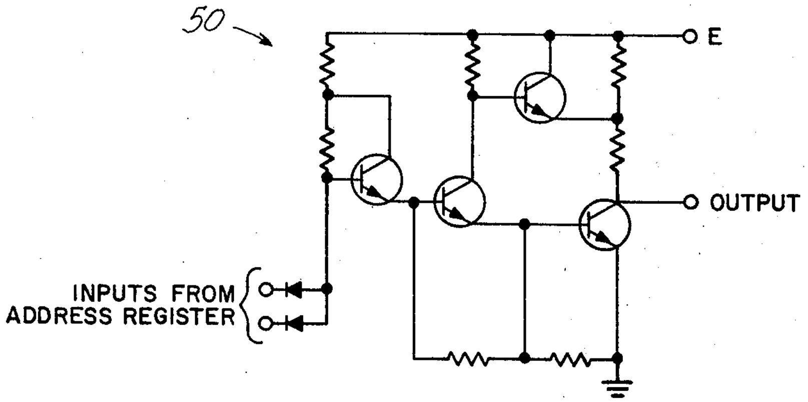
FIGURES 2 and 3 are schematic diagrams of gating circuits utilized in the circuit of FIGURE 1.
Figure 3:
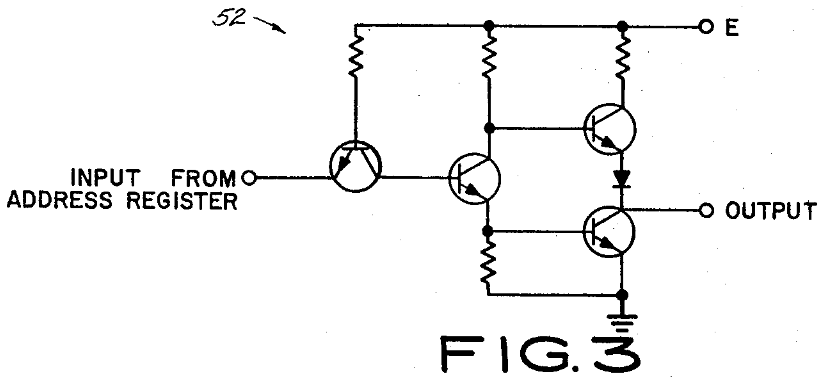

In accordance with a feature of this invention, switches 14 and 22 comprise identical components and for clarity and simplicity will be identified by the same numerals but with those of switch 22 primed. Switch 14 includes a pair of transistors 46 and 48 of PNP and NPN type, respectively, a NAND gate 50, another gate 52, a resistor 54 connected between the output of gate 50 and the base of transistor 46 and a diode 56 connected between one input 59 of gate 52 and the base of transistor 46. The output of gate 50 is connected to the other input 58 of gate 52. NAND gate 50 is of a well-known type which is responsive to a logical ZERO input at either one or both of its inputs to produce a logical ONE output and is responsive to the concurrence of logical ONE inputs to pjroduce a logical ZERO output. Gate 50 is shown in detail in FIGURE 2 of the drawings. Gate 52 is of a type responsive to a concurrence of logical ZERO signal applied at input 58 and logical ONE signal applied at input 59 to produce a logical ONE output, and to produce a logical ZERO output under any other signal inputs. This gate is shown in detail in FIGURE 3 of the drawings.

The emitters of transistors 46 and 46' and corresponding emitters of other switches are connected to a terminal 60 to which is applied a positive potential for operation of the circuit. The emitters of transistor 48, 48' and corresponding emitters of other transistors are connected to a read-write current regulators 62 of a suitable, known type. This regulator is responsive to activating pulses applied to an input 64 for allowing and controlling the passage of current from the emitter of a selected, conducting transistor.

As a part of write current circuitry, the collector of transistor 46 is connected through respective diodes 64, 66, 68, and 70 to respective first ends of lines 24, 26, 28, and 30. The anodes of these diodes are connected to the collector so as to pass conventional current from the collector to the lines. As a part of read current circuitry, the collector of transistor 48 is connected through diodes 68, 70, 72, and 74 to the first ends of these lines and the cathodes of these diodes are connected to this collector so as to pass conventional current to the collector. Similar connections are made from the collectors of transistors in switches 16, 18, and 20 to respective groups of other four horizontal lines. In switches 22, 24, 26, and 28, the transistor collectors are joined and the second ends of lines 30, 32, 34, and 36 are connected to the respective joined collectors of transistors in these switches.

The circuit 10 is operable in conjunction with an address register 80 also shown in FIGURE 1 which provides selection potentials for the selection of horizontal lines of the array 12. This register has four binary stages designated $X_0$, $X_1$, $X_2$, and $X_3$, respectively, and the respective stages provide two output signals which are logical complements of each other at any particular time for any particular selection as indicated adjacent to the output terminals by symbols such as $X_0$ and its complement $\overline{X}_0$.

For a better understanding of the invention, the operation thereof for the select energization of a core line will be described. The manner in which write current is established in line 30, arbitrarily chosen, will be described and then the establishment of read current in the same line will be described. It is therefore assumed that an appropriate electrical potential of positive polarity is applied to terminal 60, to other components such as gates and the regulator 62 of the circuit 10. Also, it is required for such selection that the respective binary states of address register 80 be represented by the binary number 0000, that is, the terminals $X_0$ $X_1$, $X_2$, and $X_3$ have logical ZERO potentials whereby terminals $\overline{X}_0$, $\overline{X}_1$, $\overline{X}_3$, and $\overline{X}_3$ have logical ONE potentials thereat. Thus, the two inputs to NAND gate 50 and the two inputs to NAND gate 50' are logical ONE and their outputs are each logical ZERO.

The logical ZERO potential herein is a low potential, substantially zero volts and logical ONE potential may be of the order of +4 volts.

In the quiescent state, a logical ONE potential is applied to the Write Enable terminal 82 and such a potential is applied to the base of transistor 46 holding the transistor in a state of nonconduction. Transistor 48, however, in the quiescent state is maintained in a state of conduction. The input 59 to gate 52 is at a logical ONE and since $X_0$ and $X_1$ are logical ONE'S, the input 58 is at a logical ZERO. Similarly, transistor 46' is maintained in a state of nonconduction and transistor 48' is maintained in a state of conduction since the quiescent potential at Read Enable terminal 84 is at a logical ONE and the two inputs, $X_2$ and $X_3$ to gate 50' are also logical ONE'S.

In response to a Write Enable pulse applied to the input 82, the conductive conditions of transistor 46 and 48 are reversed, that is, transistor 46 becomes conductive and transistor 48 becomes nonconductive. The Write Enable pulse as shown in proximity to input terminal 82 is a zero potential pulse. This pulse effectively removes the positive potential applied to the base of transistor 46. This renders this transistor conductive and as applied to input 59 of gate 52 also produces a zero potential output from this gate rendering the transistor 48 nonconductive. Thus, a conductive path is established from the potential source applied to input terminal 60, through the emitter to collector circuit of transistor 46, through diode 64, line 30, the collector to emitter junction of transistor 48', the read-write current regulator 62 and a return circuit, not shown, to the potential source applied to terminal 60.

In response to the termination of the Writer Enable pulse, the switch circuit 14 returns to its quiescent condition. In response to a Read Enable pulse applied to the terminal 84, the conductive condition of transistors 46' and 48' is reversed whereby read current is passed in an entirely similar manner from source +V at terminal 60, through the emitter to collector junction of transistor 46', the line 30, diode 72, the collector to emitter junction of transistor 48, read-write current regulator 62 and the return circuit to potential source +V applied to terminal 60.

It is thus seen that a single pulse either a Write Enable pulse or a Read Enable pulse is effective to simultaneously switch the conditions of transistors in the same switch circuit so as to effect the passage of corresponding current through a core line while in the quiescent state, the switch circuit is receptive to read or write currents, as the case may be, initiated by action at the complementary switch circuit on the other side of the core plane 12. Simplicity is effected in the circuit without sacrifice of effectiveness.

It is to be noted that the present invention has application in numerous environments and that the particular core memory arrangement shown is but one of such environments. For example, the invention is applicable for switching in other memories such as coincident current memories or even in circuits other than memories.

While the present invention has been described in a preferred embodiment, it will be obvious to those skilled in the art that various modifications can be made therein within the scope of the invention.

What is claimed is:

1. A switching circuit for selectively establishing an interconnection between one terminal and either one of a pair of other terminals comprising first and second transistors of opposite types and each having a base, an emitter and a collector, said first and second transistor being responsive to base to emitter potential biases of opposite polarity and representing logical ONE and ZERO, respectively, to render the same nonconductive, means interconnecting said one terminal and each of said collectors and means connecting said emitters to respective ones of said other terminals, a first NAND gate circuit having a plurality of inputs and an output and being responsive to input potentials representing logical ONE simultaneously applied at each of its inputs to produce an output potential representing logical ZERO and responsive to a logical ZERO potential applied at any one of its inputs to produce a logical ONE output potential, a second gate circuit having first and second inputs and an output and being responsive to signals of opposite logic at respective inputs to produce an output signal of logical ONE, the output of said first gate being connected to one input of the second gate and being resistively coupled to the base of said first transistor, means including a unidirectionally conducting device interconnecting the second input of said second gate and the base of said first transistor, said device being poled to pass electrical signals of polarity representing logical ONE to said transistor base, and means interconnecting the output of said second gate to the base of said other transistor whereby the simultaneous application of potential of either polarity to the second input of said second gate is effective to render one of said transistors conductive and the other nonconductive.

2. A switching circuit according to claim 1 wherein said first and second transistors are of PNP and NPN types, respectively.

3. A circuit according to claim 1 additionally comprising current regulating means in circuit with said pair of other terminals for controlling the current through said transistors.

4. A core line energizing circuit comprising a first switching circuit as recited in claim 1 and a second switching circuit for selectively establishing an interconnection between one terminal and either one of a pair of other terminals, said second switching circuit comprising: first and second transistors of opposite types and each having a base, an emitter and a collector, said first and second transistors being responsive to base to emitter potential biases of opposite polarity and representing logical ONE and ZERO, respectively, to render the same nonconductive, means including a unidirectionally current conductive element interconnecting said one terminal and the collector of the other of said transistors and being poled to conduct current in an opposite direction with respect to said one terminal, means connecting said emitters to respective ones of said other terminals, a first NAND gate circuit having a plurality of inputs and an output and being responsive to input potentials representing logical ONE at each of its inputs to produce an output potential representing logical ZERO and responsive to a logical ZERO at any one of its inputs to produce a logical ONE output potential, a second gate circuit having first and second inputs and an output and being responsive to signals of opposite logic at respective inputs to produce an output signal of logical ONE, the output of said first gate being connected to one input of the second gate and being resistively coupled to the base of said first transistor, means including a unidirectionally conducting device interconnecting the second input of said second gate and the base of said first transistor, said device being poled to pass electrical signals of polarity representing logical ONE to said transistor base, and means interconnecting the output of said second gate to the base of said other transistor whereby the simultaneous application of potential of either polarity to the second input of said second gate is effective to render one of said transistors conductive and the other non-conductive, said core line energizing circuit further comprising a core line interconnecting the said terminal of the first switching circuit with the said one terminal of the second switching circuit.

5. A switching circuit for selectively establishing an interconnection between one terminal and either one of a pair of other terminals comprising first and second transistors of opposites types and each having a base, an emitter and a collector, said first and second transistors being responsive to base to emitter potential biases of opposite polarity and representing logical ONE and ZERO, respectively, to render the same nonconductive, means including a undirectionally current conductive element interconnecting said one terminal and the collector of the other of said transistors and being poled to conduct current in an opposite direction with respect to said one terminal, means connecting said emitters to respective ones of said other terminals, a first NAND gate circuit having a plurality of inputs and an output and being responsive to input potentials representing logical ONE at each of its inputs to produce an output potential representing logical ZERO and responsive to a logical ZERO at any one of its inputs to produce a logical ONE output potential, a second gate circuit having first and second inputs and an output and being responsive to signals of opposite logic at respective inputs to produce an output signal of logical ONE, the output of said first gate being connected to one input of the second gate and being resistively coupled to the base of said first transistor, means including a undirectionally conducting device interconnecting the second input of said second gate and the base of said first transistor, said device being poled to pass electrical signals of polarity representing logical ONE to said transistor base, and means interconnecting the output of said second gate to the base of said other transistor whereby the simultaneous application of potential of either polarity to the second input of said second gate is effective to render on of said transistors conductive and the other nonconductive.

6. A core line excitation circuit comprising a plurality of switching circuits each having first and second transistors of opposite types and each having a base, an emitter, and a collector, said first and second transistors being responsive to base to emitter potential biases of opposite polarity and representing logical ONE and ZERO, respectively, to render the same nonconductive, a plurality of core lines composed of a plurality of groups, each line having a first end and a second end, the first ends of each group of said lines being connected to the collector of one of the transistors of a corresponding one of the said switching circuits through respective undirectionally current conducting devices poled so as to pass current in one direction with respect to said one end, said one ends of each group of lines being connected to the collector of the other of said transistors of corresponding switching circuits through respective undirectionally current conducting devices poled so as to pass current in an opposite direction with respect to said one ends, a second plurality of switching circuits each comprising first and second transistors of opposite types and each having a base, an emitter and a collector, said first and second transistors of said second plurality of switching circuits being responsive to base to emitter potential biases of opposite plurality and representing logical ONE and ZERO, respectively, to render the same nonconductive, the collector electrodes of each pair of transistors of each of said second plurality of switching circuits being interconnected, the second end of one core line of each of said groups being connected to the interconnected collectors of one and only one of said plurality of switching circuits, each of said switching circuits comprising a first NAND gate circuit having a plurality of inputs and an output and being responsive to input potentials representing logical ONE at each of its inputs to produce an output potential representing logical ZERO and responsive to logical ZERO at any one of its inputs to produce a logical ONE output potential, a second gate circuit having first and second inputs and an output and being responsive to signals of opposite logic at respective inputs to produce an output signal of logical ONE, the output of said first gate being connected to one input of the second gate and being resistively coupled to the base of said first transistor, means including a unidirectionally conducting device interconnecting the second input of said second gate and the base of said first transistor, said device being poled to pass electrical signals of polarity representing logical ONE to said transistor base, and means interconnecting the output of said second gate to the base of said other transistor whereby the simultaneous application of potential of either polarity to render one of said transistors conductive and the other nonconductive.

7. A circuit according to claim 6 wherein said plurality of said group is four and the pluralities of said first switching circuits and second switching circuits is four, respectively.

References Cited

UNITED STATES PATENTS

| | | | |
|---|---|---|---|
| 3,135,948 | 6/1964 | Ashley | 340—174 |
| 3,408,637 | 10/1968 | Gibson et al. | 340—174 |

BERNARD KONICK, Primary Examiner

G. M. HOFFMAN, Assistant Examiner

U.S. Cl. X.R.

307—241, 270